(12) United States Patent
Frehn et al.

(10) Patent No.: US 10,839,438 B2
(45) Date of Patent: Nov. 17, 2020

(54) METHOD FOR QUEUING ORDERS AT A FOOD ASSEMBLY APPARATUS

(71) Applicant: Creator, Inc., San Francisco, CA (US)

(72) Inventors: Steven Frehn, San Francisco, CA (US); Alexandros Vardakostas, San Francisco, CA (US); Jeff C. Jensen, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 506 days.

(21) Appl. No.: 15/082,921

(22) Filed: Mar. 28, 2016

(65) Prior Publication Data

US 2017/0024789 A1    Jan. 26, 2017

Related U.S. Application Data

(60) Provisional application No. 62/139,475, filed on Mar. 27, 2015.

(51) Int. Cl.
*G06Q 30/06* (2012.01)
*G06Q 50/12* (2012.01)

(52) U.S. Cl.
CPC ......... *G06Q 30/0621* (2013.01); *G06Q 50/12* (2013.01)

(58) Field of Classification Search
CPC .... G06Q 30/0621; G06Q 50/12; G06Q 50/01; H04L 67/22
USPC ....................... 705/15, 26.1, 14.53; 709/204; 235/462.1, 454; 340/572.1
See application file for complete search history.

(56) References Cited

U.S. PATENT DOCUMENTS

| 8,429,026 B1* | 4/2013 | Kolawa ................ | G06Q 30/00 705/26.7 |
| 2002/0038165 A1* | 3/2002 | McHale, IV .......... | G06Q 30/02 700/216 |
| 2003/0046166 A1* | 3/2003 | Liebman ............... | G06Q 30/06 705/15 |
| 2004/0069313 A1* | 4/2004 | DeLaquil .............. | G06Q 10/10 705/15 |
| 2006/0085265 A1* | 4/2006 | Dietz ................... | G06Q 30/02 705/15 |
| 2006/0218057 A1* | 9/2006 | Fitzpatrick ........... | G06Q 10/04 705/28 |

(Continued)

*Primary Examiner* — Vanel Frenel
(74) *Attorney, Agent, or Firm* — Harness, Dickey & Pierce, P.L.C.

(57) ABSTRACT

One variation of a method for fulfilling custom food orders includes: in response to request for a custom food order from a patron through an ordering portal executing on a computing device, retrieving a location of the computing device; identifying a set of food assembly apparatuses within a threshold distance of the location of the computing device; aggregating a list of ingredients currently loaded into the set of food assembly apparatuses; in response to selection of a particular ingredient in the list of ingredients for the custom food order, removing ingredients, from the list of ingredients, unique to a food assembly apparatus not currently loaded with the particular ingredient; selecting a particular food assembly apparatus, from the set, currently loaded with a set of ingredients specified in the custom food order; and inserting the custom food order into a food order queue assigned to the particular food assembly apparatus.

19 Claims, 5 Drawing Sheets

(56) References Cited

U.S. PATENT DOCUMENTS

| | | | |
|---|---|---|---|
| 2007/0294129 A1* | 12/2007 | Froseth | G06Q 10/08 |
| | | | 705/7.32 |
| 2009/0077007 A1* | 3/2009 | Schwarzberg | G06Q 30/02 |
| 2009/0167553 A1* | 7/2009 | Hong | G06Q 10/02 |
| | | | 340/4.61 |
| 2009/0255195 A1* | 10/2009 | Bridgman | E04H 14/00 |
| | | | 52/174 |
| 2010/0161432 A1* | 6/2010 | Kumanov | G06Q 20/102 |
| | | | 705/15 |
| 2012/0136731 A1* | 5/2012 | Kidron | G06F 19/3475 |
| | | | 705/15 |
| 2012/0323691 A1* | 12/2012 | McLaughlin | G06Q 30/00 |
| | | | 705/14.58 |
| 2013/0224694 A1* | 8/2013 | Moore | G09B 19/0092 |
| | | | 434/127 |
| 2013/0317921 A1* | 11/2013 | Havas | G06Q 30/0633 |
| | | | 705/15 |
| 2014/0006182 A1* | 1/2014 | Wilson | G06Q 50/12 |
| | | | 705/15 |
| 2014/0058902 A1* | 2/2014 | Taylor | G06Q 30/0635 |
| | | | 705/26.81 |
| 2016/0078571 A1* | 3/2016 | Singh | G06Q 50/12 |
| | | | 705/14.66 |
| 2016/0253922 A1* | 9/2016 | Kremen | G09B 19/0092 |
| | | | 434/127 |
| 2016/0314520 A1* | 10/2016 | Havas | G06Q 30/0633 |

* cited by examiner

METHOD FOR QUEUING ORDERS AT A FOOD ASSEMBLY APPARATUS

CROSS-REFERENCE TO RELATED APPLICATIONS

This Application claims the benefit of U.S. Provisional Application No. 62/139,475, filed on Mar. 27, 2015, which is incorporated in its entirety by this reference.

This Application is related to U.S. patent application Ser. No. 14/208,149, filed on Mar. 13, 2014, U.S. patent application Ser. No. 14/534,038, filed on Nov. 5, 2014, and to U.S. patent application Ser. No. 13/911,637, filed on Jun. 6, 2013, all of which are incorporated in their entireties by this reference.

TECHNICAL FIELD

This invention relates generally to the field of food preparation and more specifically to a new and useful method for queuing orders at a robot sandwich assembly apparatus in the field of food preparation.

DETAILED OF THE EMBODIMENTS

The following description of the embodiments of the invention is not intended to limit the invention to these embodiments but rather to enable a person skilled in the art to make and use this invention.

1. Method

Figure 1:
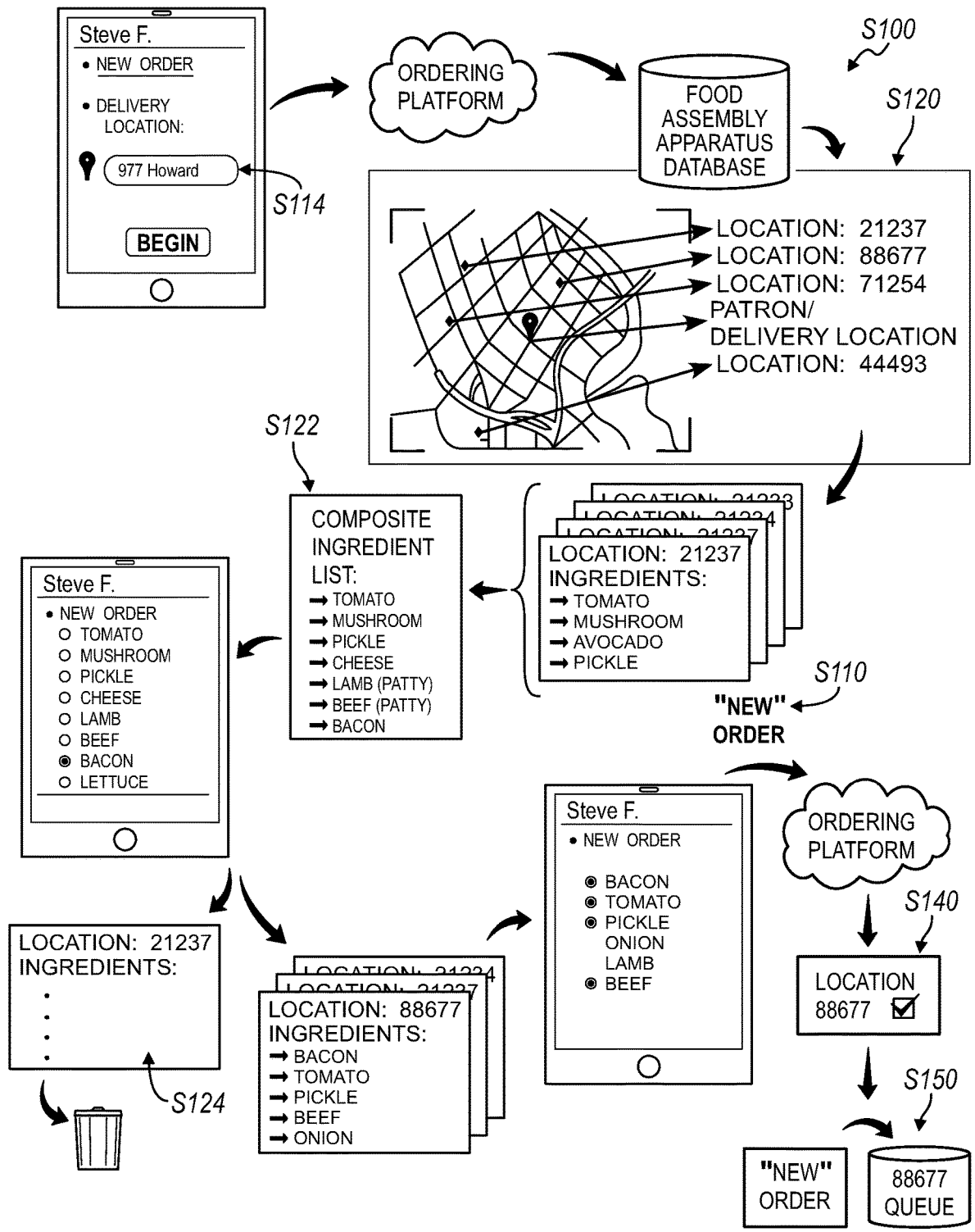
FIG. 1 is a flowchart representation of a method.

As shown in FIG. 1, a method S100 for fulfilling custom food orders includes: in response to request for a custom food order from a patron through an ordering interface executing on a computing device, retrieving a location of the computing device in Block S114; identifying a set of food assembly apparatuses within a threshold distance of the location of the computing device in Block S120; aggregating a list of ingredients currently loaded into food assembly apparatuses in the set of food assembly apparatuses in Block S122; in response to selection of a particular ingredient in the list of ingredients for the custom food order at the ordering interface, removing ingredients, from the list of ingredients, unique to a food assembly apparatus, in the set of food assembly apparatuses, not currently loaded with the particular ingredient in Block S124; selecting a particular food assembly apparatus, from the set of food assembly apparatuses, currently loaded with a set of ingredients specified in the custom food order in Block S140; and inserting the custom food order into a food order queue assigned to the particular food assembly apparatus in Block S150.

Figure 2:
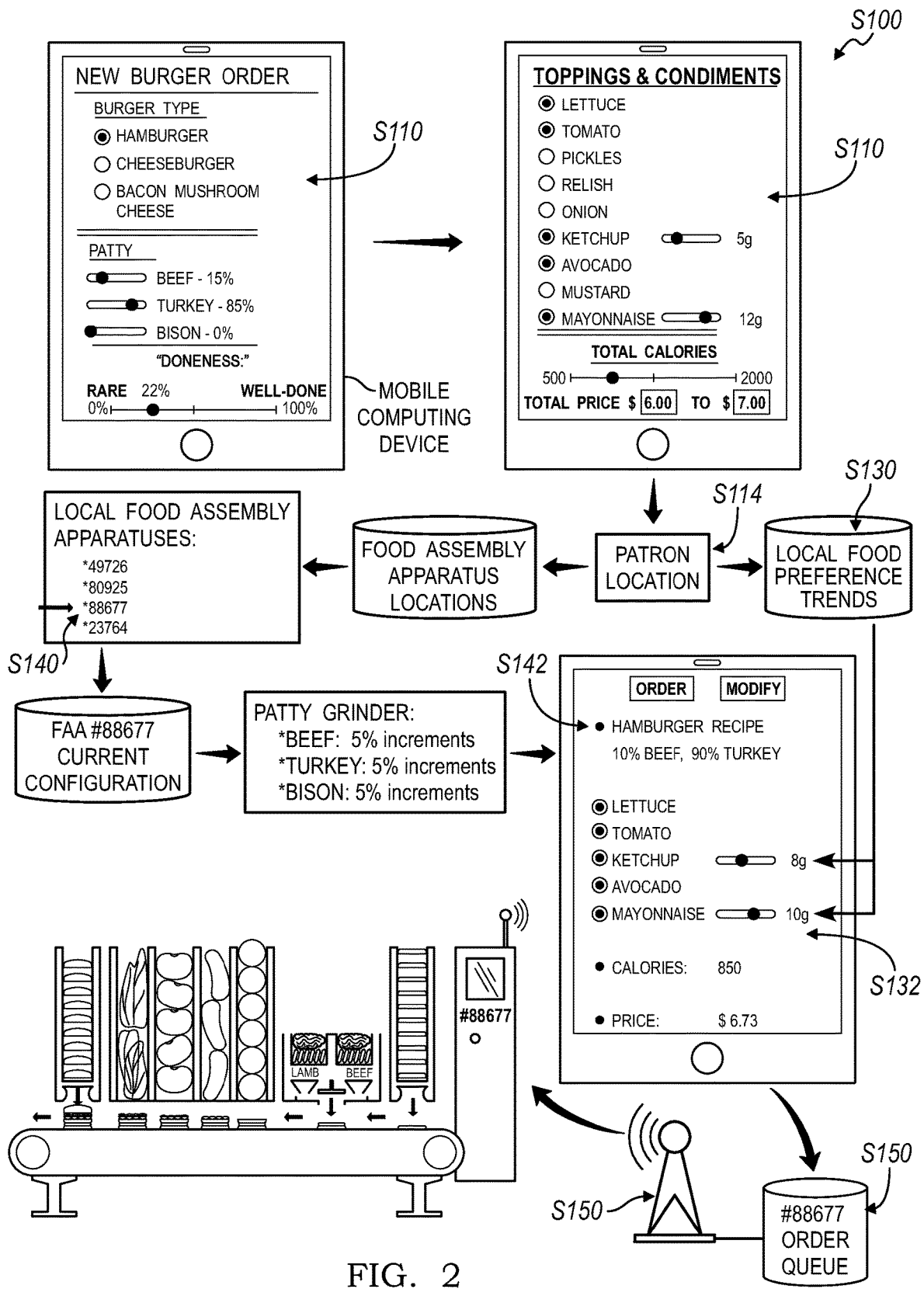
FIG. 2 is a flowchart representation of one variation of the method.

As shown in FIG. 2, one variation of the method S100 includes: in response to request for a custom food order from a patron through an ordering interface executing on a computing device, retrieving a location of the computing device in Block S114; receiving a selection for a quantity of an ingredient for the custom food order in Block S110; identifying a trend in an amount of the ingredient in food orders previously submitted within a region proximal the location of the computing device in Block S130; shifting the quantity of the ingredient specified in the custom food order toward the amount of the ingredient in Block S132; selecting a food assembly apparatus currently loaded with the ingredient and within a threshold distance of the location in Block S140; aligning the amount of the ingredient specified in the custom food order to a dispensation resolution for the ingredient supported by the food assembly apparatus in Block S142; and inserting the custom food order into a food order queue assigned to the particular food assembly apparatus in Block S150.

Figure 3:
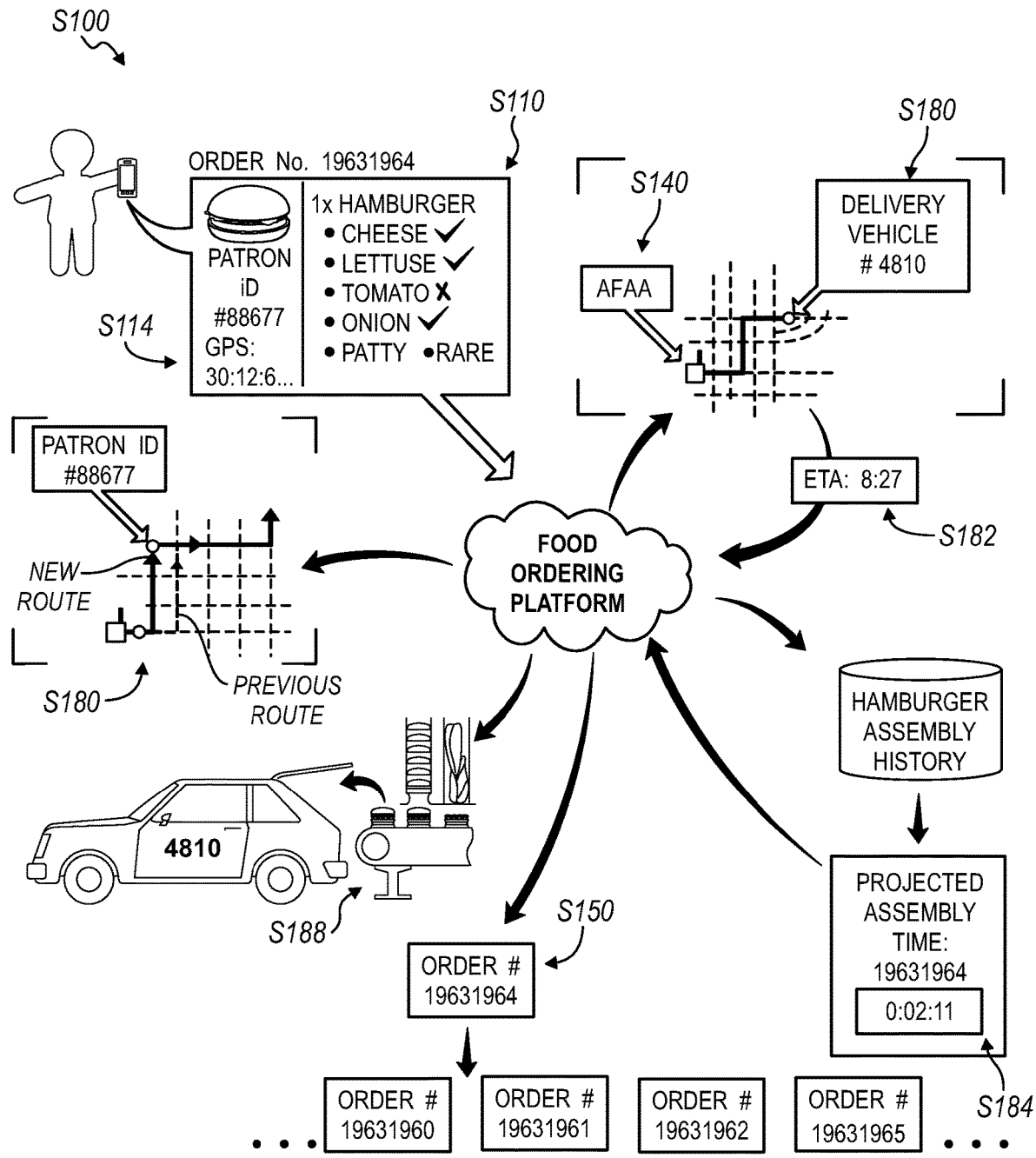
FIG. 3 is a flowchart representation of one variation of the method.

As shown in FIG. 3, another variation of the method S100 includes: retrieving a hamburger order assigned to a delivery vehicle for upcoming delivery to a corresponding patron in Block S110; predicting an arrival time of the delivery vehicle at a location associated with a food assembly apparatus in Block S182; estimating a time duration to complete (e.g., assemble) the hamburger order at the food assembly apparatus in Block S184; inserting the hamburger order into a queue at the food assembly apparatus to complete the hamburger order before the predicted arrival time of the delivery vehicle based on the estimated time duration to complete the hamburger order in Block S150; in response to arrival of the delivery vehicle at the location, releasing a hamburger to the delivery vehicle in Block S188, the hamburger assembled at the food assembly apparatus according to the hamburger order; and cooperating with a delivery service platform associated with the delivery vehicle to insert delivery of the hamburger order to the patron into a delivery schedule for the delivery vehicle in Block S180.

Figure 4:
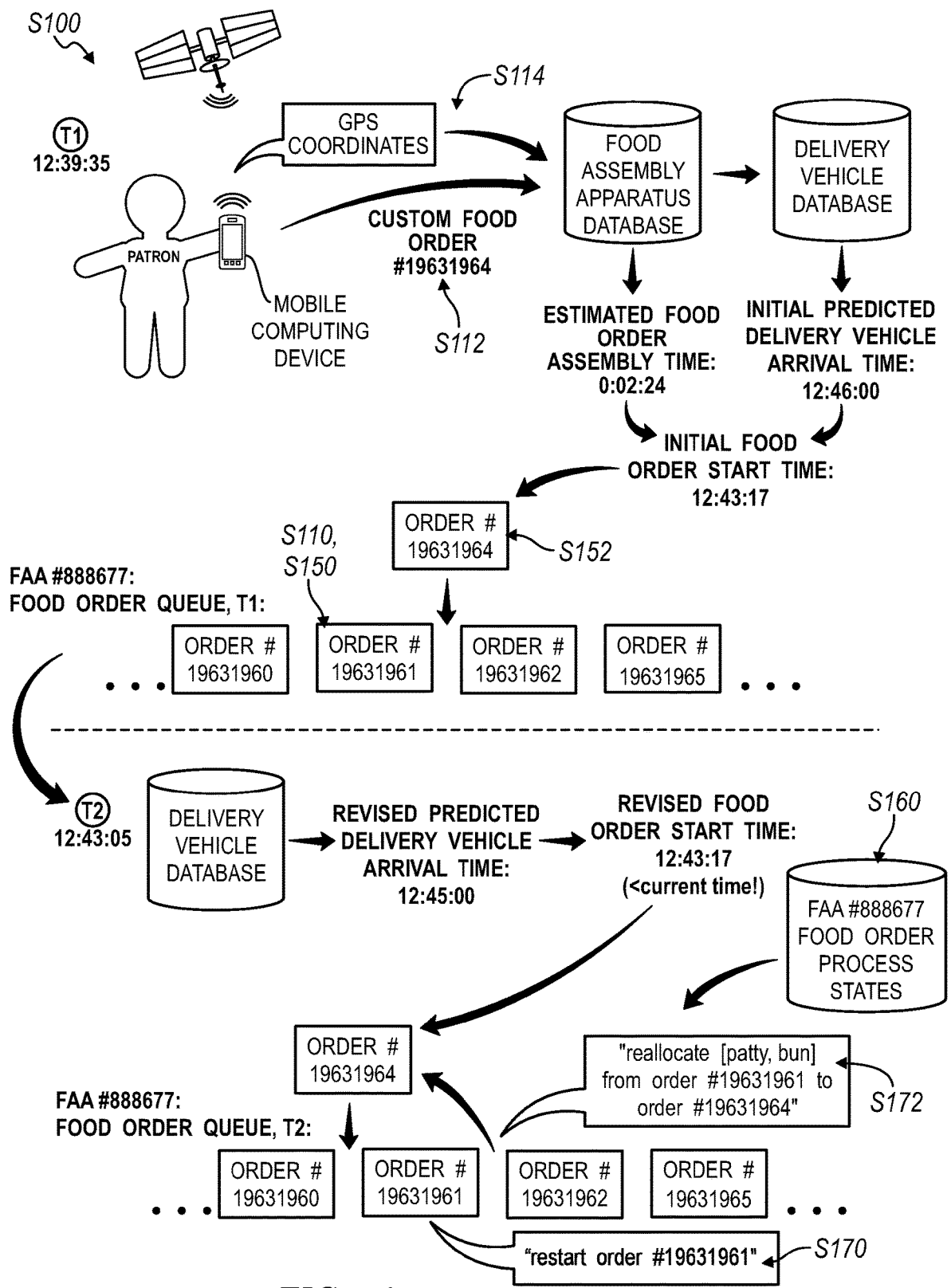
FIG. 4 is a flowchart representation of one variation of the method.

As shown in FIG. 4, yet another variation of the method S100 includes: at a first time, receiving a first custom food order specifying a first cook level of a first ingredient in Block S110; inserting the first custom food order into a food order queue associated with a food assembly apparatus in Block S150; tracking assembly of the first custom food order at the food assembly apparatus in Block S160; at a second time succeeding the first time, receiving a second custom food order specifying a second cook level of the first ingredient in Block S112; at a third time succeeding the first time, inserting the second custom food order ahead of the first custom food order in the food order queue in Block S152; in response to the second cook level of the first ingredient specified in the second custom food order exceeding an actual cook level of a first unit of the first ingredient currently in process at the food assembly apparatus and allocated for the first custom food order, reallocating the unit of the first ingredient to the second custom food order in Block S172; and allocating a second unit of the first ingredient, behind the first unit of the first ingredient in the food assembly apparatus, to the first custom food order in Block S170.

2. Applications

Generally, the method S100 can be executed by a food ordering platform: to receive food orders from remote patrons; to insert these food orders into food assembly apparatus queues based on ingredients specified in these food orders and current configurations of local food assembly apparatuses; to align ingredient specifications in food orders to local trends in taste preferences; and to re-queue orders at food assembly apparatuses over time based on timing constraints related to arrival and departure times of delivery vehicles, food order preparation time, receipt of new orders, changes in food assembly apparatus capacity, etc. In particular, the food ordering platform can host an ordering interface accessed through a native application or a web browser executing on a computing device (e.g., a smartphone, a food ordering kiosk) to initiate an order from a patron, to filter local food assembly apparatuses for completion of the patron's food order based on ingredients and other order specifications entered by the patron through the ordering interface, and to insert the patron's food order into a production queue of a particular food assembly apparatus—selecting based on various parameters—for assembly of a foodstuff according to the food order. The food ordering platform can also select a local delivery vehicle to collect the patron's food order from the food assembly apparatus and to deliver the food order to the patron's location, such as based on the delivery vehicle's current location, the delivery vehicle's current destination, the location of the food assembly apparatus, the location of the patron (or other delivery location), current traffic conditions, and a projected completion time of the patron's food order. The food ordering platform can also shift the position of the patron's food order within the food assembly apparatus's queue and reallocate ingredients from one food order to another food order in the food assembly apparatus's queue in order to slow or speed up completion of the patron's food order, such as based on changes in the projected arrival time of the delivery vehicle, changes in patron occupancy at a facility housing the food assembly apparatus, (re)prioritization of in-store or delivery orders, or changes in the patron's arrival at the store.

The food ordering platform can also implement Blocks of the method S100: to identify trends in taste preferences and/or to extrapolate general taste preferences among a group of patrons near a delivery location designated for a new custom food order submitted by a patron based on food orders previously submitted by other patrons in this group; and to adjust a quantity, cook level, or other specification of one or more ingredients cited in the new custom food order toward these taste preferences in this group of patrons. Therefore, if the patron denies the new custom food order, such as by no longer being available to collect the new custom food order or by actively indicating that he no longer desires the new custom food order, the food ordering platform can reallocate the patron's custom food order to a second patron nearby to reduce food waste while also meeting (to a degree) the second patron's taste preference. In particular, the food ordering platform can automatically adjust a custom food order to meet taste preferences of other patrons nearby in order to improve local marketability of the custom food order should its originating patron no longer want or no longer be available to collect the custom food order.

The food ordering platform can interface (or integrate) with a delivery service platform to coordinate pickup and delivery of food orders to remote patrons, such as to collect current vehicle location, predicted arrival time, and predicted delivery time and to batch or "group" multiple orders placed within a region for one or more delivery vehicles within the region over time. The food ordering platform and/or the delivery service platform can thus execute the method S100 to reduce wait time of a driver of a delivery vehicle at a food assembly apparatus when collecting one or more food orders for delivery, thereby improving revenue per unit time per driver while maintaining freshness and made-to-order authenticity of each food order thus completed.

From hereinafter, the method S100 is described generally in the context of sandwiches and specifically in the context of hamburgers (e.g., burgers, cheeseburgers, veggie burgers, etc.). For example, the method S100 can be executed to complete a custom food order at a food assembly apparatus just before arrival of a delivery vehicle for pickup and delivery of the custom food order to a corresponding patron. However, the method S100 can also be applied to any other assembled and/or prepared food such as salads, burritos, pizza, ice cream cones, banana splits, ice cream cookie sandwiches, hot dogs, deli sandwiches, falafel, gyros, layered cakes, tacos, crepes, waffles, pancakes, omelets, mixed (alcoholic or non-alcoholic) drinks, smoothies, etc. assembled in whole or in-part by a food assembly apparatus or by a human.

3. Food Assembly Apparatus

The ordering platform can execute Blocks of the method S100 in conjunction with a food assembly apparatus, such as described in U.S. patent application Ser. No. 13/911,637. The food assembly apparatus can incorporate various modules, components, sensors, control systems, etc. to enable precise assembly of custom food orders. In one implementation, the food assembly apparatus is configured to accurately and repeatably assemble custom hamburgers with custom combinations and custom quantities of available meats, buns, toppings, seasonings, and/or condiments as specified in custom hamburger orders submitted locally or remotely by patrons. For example, the food assembly apparatus can include a custom patty grinder that grinds fresh meats (e.g., beef, turkey, lamb, chicken, and/or bison) and/or meat substitutes (e.g., soybeans, chickpeas, black beans) and stamps custom patties according to specifications defined in custom hamburger orders, such as: an 8 oz. patty with 10% beef, 50% turkey, 40% bison for a first patron; and a 5.5 oz. patty with 60% bison, 20% chicken, and 20% chickpeas for a second patron. In this example, the grinder can form hamburger patties between 80 grams and 200 grams in thirty-gram increments with a tolerance of ten grams.

The food assembly apparatus can also include a broiler, oven, griddle, or other type of patty cooker configured to cook each patty for a particular period of time and/or to a particular temperature in order to achieve a patty "doneness" level specified in a custom hamburger order. For example, the broiler can include a conveyor and burner for each of a general rare, medium, and well-done doneness setting, and the food assembly apparatus can control the speed and specific temperature of each conveyor to meet each specific doneness requirement for each hamburger that moves down the conveyor to cook. In another example, the broiler can include a wide, constant-speed conveyor and a series of burners that create a temperature differential across the width of the conveyor, and the custom patty grinder can dispense a patty onto a particular lateral position on the conveyor based on a doneness level specified in a corresponding food order. The broiler or other type of patty cooker can cook patties to internal temperatures between 120° F. and 160° F. in 5° F. increments to a tolerance of 2.5° F.

The food assembly apparatus can further include a topping dispenser configured to selectively slice and dispense topping servings from fresh whole vegetables, such as one or more slices of preset thickness of lettuce, tomato, onion, and pickle based on a topping specification in a custom food order. Similarly, the food assembly apparatus can include a seasoning dispenser configured to selectively dispense particular quantities and combinations of seasonings onto a patty, topping stack, or bun, such as between 100 milligrams and 500 milligrams in 100-milligram increments to a tolerance of ten milligrams for each of salt, pepper, teriyaki blend, garlic herb blend, and other seasonings based on a seasoning specification in a custom food order. Furthermore, the food assembly apparatus can include a condiment dispenser configured to selectively dispense particular quantities and combinations of condiments onto a patty, topping stack, or bun, such as between five grams or more of each of mayonnaise, mustard, ketchup, relish, barbecue sauce, etc. to a tolerance of two grams based on a condiment specification in a custom food order.

The food assembly apparatus can further include a bagging, boxing, or plating assembly configured to place a completed hamburger in a bag, in a box, on a plate, or in any other packaging for local pickup by a patron or for remote delivery to a patron. However, the food assembly apparatus can include any other subsystems that cooperate automatically and relatively precisely to complete custom hamburger orders. The food assembly apparatus can be housed in a static structure, such as a commercial building, warehouse, or restaurant, or the food assembly apparatus can be mobile, such as installed in a truck or other vehicle.

Generally, Blocks of the method S100 are described herein as executed by an ordering platform to collect, queue, complete, deliver, and/or distribute orders for hamburgers. However, Blocks of the method S100 can be executed by any other local or distributed computer system or robotic system to collect, queue, complete, deliver, and/or distribute orders for one or more other foodstuff types.

4. Order Collection

Block S110 of the method S100 recites retrieving, from a patron, a custom food order specifying a selection for a quantity and/or quality of an ingredient. Generally, in Block S110, the ordering platform can collect or retrieve a food order entered by a patron in preparation to queue the food order at a food assembly apparatus for subsequent release or delivery to the patron. For example, in Block S110 the ordering platform can interface with an ordering interface accessed by a patron through a native application or web browser executing on a computing device (e.g., a smartphone, a standalone ordering kiosk) to retrieve a new hamburger order from the patron. In this example: the patron can submit a selection from a default hamburger menu or submit a custom order specifying a custom combination of bun toast level, patty type and doneness, topping set, seasoning and condiment set and quantities, and a destination for the food order (e.g., a pickup location, a delivery location) via the ordering interface; the ordering interface can upload the patron's order to the ordering platform via a computer network (e.g., the Internet); and the ordering platform can handle each food order as received according to other Blocks of the method S100 described below.

In one implementation, in which a group of food assembly apparatuses are provisioned with like ingredients (e.g., like types of buns, meats, toppings, seasonings, and/or condiments) and are configured to dispense similar quantities of these ingredients with similar tolerances, the ordering interface can present a static menu of ingredients for incorporation into a new custom food order. For example, the ordering interface can present a set of radio buttons, check boxes, and/or sliders labeled with ingredient types and quantities, as shown in FIG. 2, available from these food assembly apparatuses; the patron can assemble a food order by selecting and moving these radio buttons, check boxes, and/or sliders before submitting the custom food order to the ordering platform. The ordering platform can therefore receive a selection for a quantity and/or quality of one or more ingredients in a custom food order though the ordering interface in Block S110.

Before initiating the new custom order, while the patron is constructing the new custom order, once the patron selects a delivery option for the custom food order, or once the patron submits the new custom order through the ordering interface—executing on a computing device—the ordering platform can execute Block S114, which recites retrieving a location of the computing device. For example, the ordering platform can request a location from the ordering interface, and the ordering interface can request a geospatial coordinate from a geospatial sensor within the computing device executing the ordering interface and then return this geospatial coordinate to the ordering platform. Alternatively, the ordering interface can prompt the patron to select a delivery location, such as by manually entering an address or setting a pin location on a virtual map within the ordering interface, and the ordering interface can then tag the food order with this location before uploading the food order to the ordering platform. The ordering platform can then select a particular food assembly apparatus from the group of food assembly apparatuses to complete the patron's food order and can select, dispatch or request a delivery vehicle to collect and deliver the food order to the detected or selected location, as described below.

Alternatively, upon initiation of a new food order at the ordering interface, the ordering platform and/or the ordering interface can implement the foregoing methods and techniques to determine a delivery location for the food order. The ordering platform can then select a particular food assembly apparatus to complete the new food order for the patron based on the delivery location (and other parameters), as described below, and can retrieve a list of ingredients loaded into this particular food assembly apparatus and this particular food assembly apparatus's dispensation resolutions, dispensation tolerances, cooking capabilities, etc. for these ingredients. For example, food assembly apparatuses throughout a region may be loaded with different combinations of ingredients, such as to suit local cultures, local tastes and preferences, local income levels, etc. Similarly, food assembly apparatuses throughout a region may be configured with ingredient dispensers and processors that handle various ingredients in different ways. Two food assembly apparatuses within a region can therefore include different combinations of ingredients (e.g., jalapenos and jicama or lettuce and tomato) can be configured to dispense quantities of such ingredients in different increments and at different tolerances, can be configured to cook or prepare ingredients in different ways (e.g., grill, fry, or pan sear a meat patty; toast or steam a bun), and/or "customized" or modified from a standard configuration in any other suitable way. Therefore, upon determination of the patron's location and selection of a particular food assembly apparatus to complete a subsequent order for the patron, the ordering platform can access a list of ingredients currently loaded into the particular foodstuff assembly apparatus, access a current configuration of the particular food assembly apparatus, populate a menu within the ordering interface with these ingredients, and configure ingredient quantity and quality radio buttons, check boxes, and/or sliders, etc. in the menu according to the current configuration of the particular food assembly apparatus. The ordering platform can therefore customize a menu within the ordering interface based on a particular food assembly apparatus preselected to complete a subsequent food order from a patron.

Yet alternatively, upon initiation of a new food order at the ordering interface, the ordering platform and/or the ordering interface can implement the foregoing methods and techniques to determine a delivery location for the food order in Block S114, can then implement methods and techniques described below to identify multiple food assembly apparatuses sufficiently proximal the patron's location (or the patron's entered delivery location) to fulfill (e.g., deliver) the patron's food order in Block S120, and can dynamically populate a menu of ingredients and ingredient options within the ordering interface based on ingredients and ingredient options selected by the patron in Block S124. In this implementation, once a set of nearby food assembly apparatuses are identified in Block S120, the ordering platform can query each identified food assembly apparatus to retrieve current ingredient lists and configurations directly from these food assembly apparatuses, such as over a computer network (e.g., the Internet). Alternatively, the ordering platform can retrieve these ingredient lists and configurations from a food assembly apparatus database. The ordering platform can then aggregate these lists of ingredients and ingredient options into an initial menu and present this initial menu to the patron through the ordering interface in Block S122. Upon selection of a first ingredient and/or ingredient option at the ordering interface, the ordering platform can: compare the first ingredient and/or ingredient option to the ingredient lists and configurations to identify a particular food assembly apparatus—in the set of food assembly apparatuses—not currently loaded with the ingredient and/or not currently configured to complete the selected ingredient option; identify another ingredient and/or ingredient option unique to this particular food assembly apparatus; remove this other ingredient and/or ingredient option from the menu; and then refresh the menu shown in the ordering interface in Block S124. The ordering platform can therefore dynamically update a menu of ingredients and ingredient options available to the patron based on the patron's current location (or selected delivery location) and a sequence of ingredients and ingredient options selected by the patron. Upon completion of the food order, the ordering platform can select a (single) remaining food assembly apparatus in the set to complete the food order or implement methods and implement techniques described below to select a particular food assembly apparatus from the set to complete the food order.

5. Food Assembly Apparatus Selection

Block S120 of the method S100 recites selecting a food assembly apparatus to complete the custom food order submitted by the patron. Generally, in Block S120, the ordering platform can identify one or more food assembly apparatuses sufficiently proximal the patron's location (or a delivery location entered by the patron) and configured with ingredients and/or subsystems suitable to assemble a foodstuff according to the patron's custom food order.

In one implementation, the ordering platform assigns a food assembly apparatus geographically nearest the patron's location to the custom food order. The ordering platform can alternatively: identify a set of food assembly apparatuses geographically near the patron's location (e.g., within two miles in a congested city center or within seven miles in a suburban region); access current production capacity, real-time demand, and/or current in-store patron occupancy at each food assembly apparatus in the set; and select a particular food assembly apparatus—from this set—currently experiencing a greatest production capacity, a least real-time demand, and/or a lowest in-store patron occupancy. For example, the ordering platform can retrieve production capacity from queues assigned to food assembly apparatuses in this set, by extrapolating current demand from a recent frequency of food orders entered by other patrons, etc. For example, the ordering platform can select a first food assembly apparatus at a first distance from the location over a second food assembly apparatus at a second distance from the location less than the first distance to complete the patron's food order in response to a second demand for food orders at the second food assembly apparatus exceeding a first demand for food orders at the first food assembly apparatus even though the second food assembly apparatus is geographically closer to the delivery location.

Similarly, the ordering platform can: identify a set of delivery vehicles available to pickup food orders from this set of food assembly apparatuses and to deliver the custom food order to the patron; for each delivery vehicle calculate a fastest route from a current location of each food assembly apparatus and on to the patron's location based on current traffic data; and then select a particular delivery vehicle and food assembly apparatus pair yielding a minimum delivery time. The ordering platform can therefore identify a set of delivery vehicles within a threshold range of the patron's location, identify a set of food assembly apparatuses within a threshold travel time of the delivery vehicles, and select one delivery vehicle and one food assembly apparatus from for the patron's upcoming food order to yield a minimum delivery time for the patron. Alternatively, the ordering platform can select a delivery vehicle and food assembly apparatus pair that limits wait time for the delivery vehicle at the food assembly apparatus, such as by selecting a delivery vehicle further than an average time to complete a custom food order away from a selected food assembly apparatus.

The ordering platform can also retrieve past in-store and/or delivery order history for the patron, identify trends in ingredient quantities and/or qualities from this order history, and select a particular food assembly apparatus—from a set of local food assembly apparatuses—currently loaded with ingredients and configured to process ingredients according to these trends. However, the ordering platform can select a particular food assembly apparatus to complete the patron's upcoming food order in any other way and according to any other parameter.

Furthermore, in the implementation described above in which the ordering platform aggregates ingredients and ingredient options from a set of food assembly apparatuses and dynamically adjusts a menu of ingredients and ingredient options presented to the patron based on patron selections within the ordering interface, the ordering platform can implement the foregoing methods and techniques to select multiple food assembly apparatuses that meet one or more geographical distance, travel time, production capacity, and/or other conditions, as described above, such as two, five, or twenty local food assembly apparatuses currently online and available to produce generic and/or custom hamburgers. In Block S140, upon the patron's submission of the food order, the ordering platform can select the food order to a single remaining food assembly apparatus—in the set of food assembly apparatuses filtered according to the patron's ingredient and ingredient options selections—to complete the patron's food order. Alternatively, if the final food order can be completed by multiple food assembly apparatuses in the set, the ordering platform can distribute the food order to a particular food assembly apparatus geographically nearest the delivery location, that limits delivery vehicle travel time, that is currently experiencing a highest current production capacity, that is currently experiencing a lowest real-time demand, that is currently experiencing a lowest in-store patron occupancy, etc. according to the methods and techniques described above. However, the ordering platform can implement any other method or technique to select a food assembly apparatus to complete the patron's food order.

6. Food Order and Food Assembly Apparatus Alignment

One variation of the method S100 includes Block S142, which recites aligning a quantity and/or quality of an ingredient specified in the food order to a dispensation and/or processing resolution for the ingredient supported by the selected food assembly apparatus. Generally, in Block S142, the ordering platform modifies a quantity and/or quality of an ingredient specified in the patron's food order to align with processing capabilities of the food assembly apparatus selected to complete the food order. For example, various subsystems in the selected food assembly apparatus may be configured to dispense quantities of meat, toppings, seasonings, and condiments in discrete mass (or volume) steps, while the ordering interface can present ingredient quantity selection to the patron through a continuous virtual slider (e.g., from "none" to a predefined standard ingredient-specific maximum), as shown in FIG. 2. Therefore, the ordering platform can project an ingredient quantity specified in the patron's original food order onto ingredient quantity steps supported by the selected food assembly apparatus—such as by rounding a specified ingredient quantity up or down to a nearest step supported by the selected food assembly apparatus—to form a justified food order that can be executed. In this example, upon selection of the food assembly apparatus to complete the food order in Block S140, the ordering platform can query the food assembly apparatus for its current configuration or retrieve configuration data for the food assembly apparatus from a food assembly apparatus database, as described above, to collect such processing capability data for the food assembly apparatus.

However, the ordering platform can implement any other method or technique to align the patron's custom food order to current capabilities of the selected food assembly apparatus. The ordering platform can then insert the justified food order into a food order queue assigned to the selected food assembly apparatus in Block S150.

7. Delivery Vehicle Selection

Block S180 of the method S100 recites selecting a particular delivery vehicle, from a set of delivery vehicles proximal the selected food assembly apparatus, to deliver the custom food order to the delivery location. Generally, in Block S180, the ordering platform selects a delivery vehicle to deliver the patron's food order to a delivery location assigned to the food order.

In one implementation, the ordering platform transmits a delivery vehicle request with pickup location, delivery location, and pickup time or time window to an external delivery service platform. In this implementation, the delivery service platform can return pickup confirmation, delivery vehicle identification data, estimated arrival time, etc. to the ordering platform; and the ordering platform can insert the food order into a queue assigned to the selected food assembly apparatus based on these data, as described below.

Alternatively, the ordering platform can request and/or retrieve vehicle location, heading, and/or current destination data, etc. from the delivery service platform and select a particular delivery vehicle from delivery vehicle data returned by the delivery service platform. For example, the ordering platform can select: a delivery vehicle nearest the food assembly apparatus; a delivery vehicle currently on a route that nears the food assembly apparatus; a delivery vehicle currently en route to a destination near the delivery location; a delivery vehicle currently within a travel time range—bounded by the projected time to complete the food order, more or less 10% or more or less one minute—of the food assembly apparatus; etc. However, the food assembly apparatus (or the external delivery service platform) can select a delivery vehicle to collect and deliver the food order according to any other parameter.

Upon selection of the delivery vehicle, the ordering platform (or the external delivery service platform) can dispatch the delivery vehicle to the food assembly apparatus to collect the custom food order.

8. Batched Delivery

Furthermore, in Block S180, the ordering platform can batch multiple food orders received from various remote patrons within a limited period of time—such as between departure of a last delivery vehicle from the food assembly apparatus and arrival of a subsequent delivery vehicle at the food assembly apparatus—and assign the group of food orders in the batch to one delivery vehicle for subsequent delivery to their corresponding patrons.

In this variation, the ordering platform can implement the foregoing methods and techniques to collect custom food orders from multiple patrons within a region, to assign the group of custom food orders to one food assembly apparatus, and to select one delivery vehicle to collect the group of custom food orders from the food assembly apparatus and to deliver these custom food orders to their patrons. For example, the ordering platform can batch custom food orders to one food assembly apparatus and to one delivery vehicle by capping a time from pickup of a food order from the food assembly apparatus to delivery to a corresponding patron at ten minutes (or any other time limit or threshold to maintain freshness of the food order) or by capping a time from entry of a food order to estimated delivery of the food order. The ordering platform can therefore account for a time necessary to assemble all food orders in a batch and to deliver these food orders to the patrons when aggregating the food orders into a batch and assigning the food orders to one food assembly apparatus and to one delivery vehicle for assembly and delivery respectively.

9. Delivery Vehicle Arrival Time

Block S182 of the method S100 recites calculating an arrival time of the delivery vehicle to the food assembly apparatus (or to a location housing the food assembly apparatus). Generally, in Block S182, the ordering platform can predict the arrival time of the delivery vehicle—assigned to the food order—to the food assembly apparatus. In one example, the ordering platform retrieves a current location of the delivery vehicle assigned to the food order, a current route assigned to the delivery vehicle, a delivery schedule preceding arrival at the food assembly apparatus for the delivery vehicle, and traffic information along (and near) the delivery vehicle's current route. In this example, the ordering platform can retrieve these data directly from the delivery vehicle, from the external delivery service platform, from an external traffic and mapping service, etc.

From the foregoing data, the ordering platform can estimate a time at which the delivery vehicle will arrive at the food assembly apparatus. For example, the ordering platform can transform these data into: a most likely time of arrival of the delivery vehicle, such as to the minute, to the second, or to a five-second window; an earliest possible time of arrival; or an arrival time window bounded by confidence intervals (e.g., 95% confidence intervals) of fastest and slowest arrival times of the delivery vehicle. The ordering platform can then insert the patron's food order into the food assembly apparatus's queue based on the delivery vehicle's anticipated arrival time and an estimated completion time for the food order, as described below.

The ordering platform can repeat this process between selection of the delivery vehicle and pickup of the food order by the delivery vehicle in order to maintain a current estimate of the delivery vehicle's arrival time at the food assembly apparatus.

10. Order Completion Time

One variation of the method S100 includes Block S184, which recites estimating a duration of time necessary for the food assembly apparatus to complete assembly of the patron's food order. In one implementation, in Block S184, the ordering platform retrieves standard processing times for stations in the food assembly apparatus, such as standard times: to grind and form a meat patty, to grill a meat patty to rare, medium rare, and well-done doneness levels; to slice, butter, and toast buns; to slice and dispense one serving of a topping; to dispense a small serving, a medium serving, and a large serving of a seasoning; to dispense a small serving, a medium serving, and a large serving of sauce; to grate, dispense, and melt cheese; and to box a hamburger. Alternatively, the ordering platform can retrieve actual historical performance data for the foregoing time values specific to the food assembly apparatus. For the food assembly apparatus that also includes replaceable or indexable hoppers (as described in U.S. patent application Ser. No. 13/911,637) containing buns, patties, toppings, seasonings, and/or condiments, the ordering platform can also retrieve a current fill level for a hopper containing a particular topping (or bun, meat, seasoning, condiment, etc.) in the food assembly apparatus, an availability of a full replacement hopper containing the topping, an estimated time or number of subsequent food orders to empty the hopper, and an estimated delay time to replace the hopper with the replacement hopper. The ordering platform can implement these data to estimate the time to complete the hamburgers in the batch with a greater degree of accuracy. The ordering platform can then apply these ingredient processing and machine process data to estimate a time to construct (e.g., assemble, complete) the patron's food order.

In this implementation, the ordering platform can then apply ingredient quantity and quality specifications in the patron's food order—such as meat doneness, bun toast level, topping selections, condiment selections, and packaging selection (e.g., bagging or boxing)—to the processing time to predict a total amount of time necessary to assemble a hamburger from start to ready for delivery with new ingredients (i.e., ingredients not previously allocated to another food order, as described below) according to the patron's custom food order. The ordering platform can then add this total time to the current time of day to estimate a time of day at which the food order will be ready for pickup. Alternatively, the ordering platform can access a queue assigned to the food assembly apparatus, access states of food orders currently in process at the food assembly apparatus, implement the foregoing methods and techniques to estimate a time remaining to complete food orders currently in process at the food assembly apparatus and to complete food orders in the queue but not yet in process at the food assembly apparatus. The ordering platform can then add these times to the current time to estimate a soonest time at which the patron's food order may be completed at the food assembly apparatus without necessitating reordering (or "re-queuing") of food orders at the food assembly apparatus, as described below. The ordering platform can then compare this time to the estimated arrival time of the delivery vehicle to estimate the amount of time the delivery vehicle will wait to receive the food order from the food assembly apparatus. For example, if the food assembly apparatus estimates a positive wait time for the delivery vehicle, the ordering platform can compare this estimate wait time to a threshold wait time and then preemptively reassign another delivery vehicle to collect the food order. Similarly, if the food assembly apparatus estimates a positive wait time for the delivery vehicle that exceeds the threshold wait time, the ordering platform can preemptively reallocate ingredients from other food orders currently in process at the food assembly apparatus to the food order, as described below, in order to complete the food order (and release the food order to the delivery vehicle) prior to expiration of this threshold wait time.

Alternatively, the ordering platform can project a latest time that assembly of the food order may be initiated at the food assembly apparatus to substantially eliminate or minimize wait time of the delivery vehicle at the food assembly apparatus. For example, the ordering platform can subtract the estimated duration to complete the food order from an estimated arrival time of the delivery vehicle to estimate a last possible time to process the food order that does not add wait time for the delivery vehicle. In this example, the ordering platform can also compensate for an average or maximum time for a worker to manually collect the food order and to bring the food order to the delivery vehicle waiting outside.

Throughout operation, the ordering platform can repeat the foregoing process to recalculate a completion time for the food order, such as after each preceding food order is completed at the food assembly apparatus and after completion of each subassembly stage during assembly of the food order.

For a batch of food orders assigned to pickup by one delivery vehicle, the ordering platform can: implement similar methods and techniques to estimates time to complete each food order in the batch; retrieve a standard or food assembly apparatus-specific dwell period (i.e., delay time) between completion of two consecutive hamburgers at the food assembly apparatus; and sum these food order completion times and interposed dwell periods into a total time to complete the batch of food orders at the food assembly apparatus. In this implementation, the ordering platform can then add this total time to the current time of day to estimate a time of day at which all food orders in the batch will be ready for pickup if all food orders are assembled consecutively at the food assembly apparatus beginning immediately. The ordering platform can similarly implement methods and techniques as described above to estimate a last start time for the batch of food orders, to estimate a wait time for the delivery vehicle, to trigger reassignment of the batch to another delivery vehicle, or to trigger reallocation of in-process ingredients from other food orders to food orders in the batch in order to meet maximum wait time or other delivery requirements.

11. Queuing

Block S150 of the method S100 recites inserting the custom food order into a food order queue assigned to the food assembly apparatus. Generally, in Block S150, the ordering platform inserts the patron's food order into a queue assigned to the selected food assembly apparatus for subsequent processing. For example, the ordering platform can append the food order to the existing queue such that food orders are processed by the food assembly apparatus in order of submission. Alternatively, the ordering platform can insert the food order between two existing food orders in the queue, wherein at least the latter of the two existing food orders in the queue is not yet in process at the food assembly apparatus. For example, the ordering platform can prioritize food orders in the queue based on food order cost, based on order frequency of their corresponding patrons (e.g., by prioritizing new patrons who have never ordered from the ordering platform or an affiliated food assembly apparatus over all other patrons and then prioritizing patrons according to frequency of order submissions), based on whether food orders are designated for in-store pickup or delivery, based on food order size (e.g., number of items in a food order), etc. For example, the ordering platform can insert a second food order ahead of a preceding custom food order in the food order queue if the cost of the second food order exceeds the cost of the previous food order. The ordering platform can therefore reorder food orders in the queue and insert new food orders between existing food orders in the queue accordingly, such as in real-time.

The ordering platform can also insert the patron's food order between existing food orders in the queue in order to enable the food assembly apparatus to complete the food order prior to, upon, or within a threshold wait time of the anticipated arrival of the delivery vehicle to the food assembly apparatus. In one example in which the food assembly apparatus queue is sparse, the ordering platform can insert the patron's food order into the queue and assign a start time to begin assembly of the food order estimated to yield completion of the food order no more than one minute before and no more than thirty seconds after the delivery vehicle's estimated arrival at the food assembly apparatus. In this example, as additional food orders are received, the food assembly apparatus can intersperse food orders designating in-store pickup around the patron's food order in the queue and can shift the patron's food order forward in the queue (or shift the start time for the patron's food order forward) to accommodate another food order designating delivery and the estimated arrival time of its corresponding delivery vehicle. In another example in which the food assembly apparatus queue is more populated, the ordering platform can preferentially shift food orders designating in-store pickup backward to accommodate food orders designating delivery in order to align completion of these delivery food orders to arrival of their corresponding delivery vehicles, thereby shifting wait for a food order from a delivery vehicle to an in-store patron who may be less sensitive to delays.

Over time, the ordering platform can repeat the foregoing methods and techniques to reorder food orders in the queue, such as in response to changes in the anticipated completion times of preceding food orders, in response to differences between actual and anticipated completion times of preceding food orders, in response to changes in the anticipated delivery vehicle arrival time, or in response to receipt of higher- or lower-priority food orders, etc.

In one example, following assignment of a delivery vehicle to a new food order in Block S180, the ordering platform calculates an initial arrival time of the delivery vehicle to a particular food assembly apparatus in Block S182. (Alternatively, the ordering platform can retrieve arrival time estimates from an external delivery service platform or from an external mapping service in Block S180, as described above.) The ordering platform also estimates a duration of time to complete the new food order from unallocated ingredients (i.e., ingredients not previously allocated to another food order) in Block S182 and inserts the new food order in the food assembly apparatus's queue at an initial position—behind a previous food order and ahead of a subsequent food order—projected to yield completion of the new food order thirty seconds before the anticipated arrival time of the delivery vehicle. In this example, until the delivery vehicle collects the food order, the ordering platform repeatedly recalculates the delivery vehicle's arrival time to the food assembly apparatus, such as every thirty seconds until the delivery vehicle arrives. If the anticipated arrival time of the delivery vehicle to the food assembly apparatus drops by more than forty seconds (corresponding to a delivery vehicle wait time greater than ten seconds), the ordering platform can shift the new food order to a second position in the queue ahead of both the previous food order and the subsequent food order in order to enable the food assembly apparatus to complete the new food order prior to arrival of the delivery vehicle. As described below, if the previous food order and/or the new food order are already in process at the food assembly apparatus when an earlier delivery vehicle arrival time is calculated, the ordering platform can reallocate in-process ingredients from the previous food order to the new food order in Block S172, as described below. Similarly, if the anticipated delivery vehicle arrival time increases by more than one minute (corresponding to food order hold time at the food assembly apparatus greater than ninety seconds), the ordering platform can shift the new food order to a second position in the queue behind both the previous food order and the subsequent food order in order to enable the food assembly apparatus to assemble other food orders (e.g., other food orders designating in-store pickup) sooner without increasing wait time for the delivery vehicle.

Furthermore, in the variation described above in which the ordering platform batches food orders for production by one food assembly apparatus and for delivery by one delivery vehicle, the ordering platform can implement similar methods and techniques to insert multiple food orders in a batch into an assembly queue at the food assembly apparatus such that the last food order in the batch is completed by a target time. For example, the ordering platform can batch a contiguous set of food orders into the food assembly apparatus queue such that the batch of food orders is assembled without interruption and is completed between 30 seconds before and 10 seconds after the delivery vehicle is scheduled to arrive at the food assembly apparatus.

12. Local Pickup

The ordering platform can also handle food orders designated for local pickup by a patron. In one implementation, the ordering platform cooperates with the food assembly apparatus to monitor and control a time from receipt of a food order from a patron to local (i.e., in-store) delivery of the food order to the patron. In this implementation, the ordering platform can set patron expectations for delivery of his food order in order to preserve options for reordering the food assembly apparatus queue. For example, upon receipt of a food order specifying local pickup from a patron, the ordering platform implements methods and techniques described above to estimate a completion time for the order based on ingredients and ingredient options in the food order and based on the food assembly apparatus's current queue and then present to the patron—through the ordering interface—a delivery time in excess of the estimated completion time for the food order. In this example, the ordering platform can indicate to the patron—through the ordering interface—that the patron's food order will be complete and ready for local pickup "in approximately five minutes" despite an estimated completion time between 0:02:18 and 0:02:22 to assemble and package the food order for local pickup, thereby allocating a completion buffer 0:02:38 and 0:02:42 in duration. In this example, if the patron's food order is finished in less than five minutes from receipt of the food order, the food assembly apparatus (or a representative of the food assembly apparatus) can release the food order to the patron early, thereby exceeding the patron's expectations. (Alternatively, if the patron's food order is finished in less than five minutes, the food assembly apparatus or representative can withhold the patron's food order until the five-minute period approaches.) However, if a higher-priority food order is received within this five-minute period, such as a second food order specifying delivery and assigned to a delivery vehicle scheduled to arrive at the food assembly apparatus within three minutes, the ordering platform can insert this second food order ahead of this earlier food order in order to complete the second order before arrival of the corresponding delivery vehicle while also completing the earlier food order before the pickup time originally presented to the patron. For example, for the food assembly apparatus configured to output one completed food order every ten seconds and to complete a food order from start to finish in (on average) 0:02:20, the food assembly apparatus can insert fifteen food orders—received after a local patron's order—ahead of the local patron's food order in the queue while still delivering the local patron's food order in sooner than the original completion time presented to the local patron.

The ordering platform can therefore implement a completion buffer of sufficient size to support rearrangement of the food assembly apparatus's queue based on timing needs for subsequent food orders. Alternatively, the ordering platform can set a completion buffer dynamically, such as based on current or anticipated demand. In another implementation, the ordering platform can assign a custom buffer duration or select a particular preset buffer duration for a patron based on identified or interpolated needs or expectations of the patron. For example, when a patron submits a food order—including a custom hamburger and an order for a side of fries—for in-store pickup, the ordering platform can prompt the patron to indicate whether the hamburger and fries should be served together or if the fries should (or may) precede the hamburger; if the former, the ordering platform can determine that the patron has a relatively strict wait time limit and elect a shorter buffer duration (e.g., thirty seconds) for the food order; and if the latter, the ordering platform can determine that the patron has a relatively less stringent wait time limit and elect a longer buffer duration (e.g., two minutes) for the food order. Alternatively, the ordering platform can prompt the patron to directly enter an expected dining duration, such as from a drop-down menu of fifteen-minute intervals within the ordering interface, and set a buffer duration proportional to this dining duration. Yet alternatively, the ordering platform can retrieve historical dining data for the patron and predict the patron's current wait time sensitivity. However, the ordering platform can estimate, or interpolate, or collect a wait time preference or sensitivity for the patron in any other way. The ordering platform can then set a custom buffer duration or select a preset buffer duration for the patron accordingly.

For example, when a first in-store food order is received from a first patron with a relatively low wait time sensitivity, the ordering platform can assign a relatively long buffer duration of two minutes to the first food order. However, when a second in-store food order is later received—prior to completion of the first food order—from a second patron with a relatively high wait time sensitivity, the ordering platform can insert the second food order ahead of the first food order in the food assembly apparatus queue in order to ensure that the second order is promptly delivered to the second patron. Furthermore, when a third delivery food order is received and a delivery vehicle is dispatched to the food assembly apparatus to collect the third food order, the ordering platform can insert the third food order ahead of the first and second food orders to meet wait time limits of the delivery vehicle while also meeting wait time expectations of the first and second patrons.

The ordering platform can implement similar methods and techniques to determine or estimate a wait time sensitivity of a remote patron and then select a delivery vehicle, select a food assembly apparatus to complete the remote patron's food order, and similarly queue the remote patron's food order according to his wait time sensitivity.

13. Ingredient Reallocation

In one variation, the ordering platform also reallocates in-process ingredients from a first food order to a second food order in the food assembly apparatus's queue in order to complete the second food order at an earlier time.

In one implementation, the ordering platform reassigns one or more ingredients currently being processed or already processed at the food assembly apparatus for a local patron's food order to a remote patron's order in preparation for immediate or upcoming pickup of the remote patron's food order by an assigned delivery vehicle. In this implementation, following receipt of a new food order from the remote patron and assignment of a delivery vehicle to deliver the new food order, the ordering platform can implement methods and techniques described above to determine that the delivery vehicle will arrive at the food assembly apparatus before the new food order is completed if the food assembly apparatus assembles the new food order from unallocated ingredients. Accordingly, the ordering platform can shift the remote patron's food order ahead of the local patron's food order and reallocate in-process ingredients from the local patron's food order to the remote patron's food order in order that the food assembly apparatus can complete the remote patron's food order before (or within a threshold wait time after) the delivery vehicle arrives at the food assembly apparatus. For example, the food assembly apparatus can redistribute a bun heel and a bun crown already sliced, buttered, and in the process of toasting and/or a patty already ground, pressed, and in the process of cooking—currently assigned to the local patron's food order—to the remote patron's order and then shift the local patron's back in the buffer by less than a completion buffer (described above), thereby achieving both a tight time constraint for pickup by the delivery vehicle and fulfillment of the local patron's order within an expected time (e.g., within five minutes from submission of the food order).

In the foregoing implementation, the ordering platform can select a particular local food order—currently in queue at the food assembly apparatus—from which to reallocate in-process ingredients to the remote food order based on one or more parameters. For example, the ordering platform can reallocate in-process ingredients from a particular local food order entered by a patron associated with low wait time sensitivity over another local food order entered by another patron associated with higher wait time sensitivity. The ordering platform can similarly reallocate ingredients from a first local food order to a second local food order, such as if a corresponding second patron exhibits a greater wait time sensitivity than the corresponding first patron. The ordering platform can also reallocate ingredients from a first delivery order to a second delivery order, such as if a second delivery vehicle assigned to the second food order is predicted to arrive before a first delivery vehicle assigned to the first order.

In this variation, the method S100 can include: receiving a first custom food order specifying a first cook level of a first ingredient in Block S110; inserting the first custom food order into a food order queue associated with a food assembly apparatus in Block S150; tracking assembly of the first custom food order at the food assembly apparatus in Block S160; at a second time succeeding the first time, receiving a second custom food order specifying a second cook level of the first ingredient in Block S112; at a third time succeeding the first time, inserting the second custom food order ahead of the first custom food order in the food order queue in Block S152; in response to the second cook level of the first ingredient specified in the second custom food order exceeding an actual cook level of a first unit of the first ingredient currently in process at the food assembly apparatus and allocated for the first custom food order, reallocating the unit of the first ingredient to the second custom food order in Block S172; allocating a second unit of the first ingredient, behind the first unit of the first ingredient in the food assembly apparatus, to the first custom food order in Block S170. Therefore, in this implementation, the ordering platform can reallocate an in-process ingredient from one food order to another food order based on the current cook state (e.g., "doneness level") of the ingredient currently assigned to one food order and a cook level for the ingredient specified in another food order. For example, when reallocating the unit of the first ingredient from the first food order to the second food order in Block S172, the ordering platform can: proximal the third time, retrieve a current doneness of a meat product—designated for the first food order—in process at the food assembly apparatus; and reallocate this meat product from the first food order to the second food order based on a doneness specified in the second food order exceeding the current doneness of the meat product.

Therefore, in the foregoing example, for a set of hamburger patties (or units of another type of meat product) currently in various stages of cooking in a griddle subsystem within the food assembly apparatus, the food assembly apparatus can retrieve current temperatures of these hamburger patties detected by temperature sensors in the griddle subsystem and/or retrieve current cook times for these hamburger patties from the food assembly apparatus. Based on these hamburger patty temperatures and/or cook times, the food assembly apparatus can identify one or more of these in-process hamburger patties of doneness less than or equal to a doneness level specified in a new food order to be promoted in the queue. If multiple such in-process hamburger patties are thus identified, the ordering platform can select a particular hamburger patty from this set to reallocate to the new food order, such as based on wait time sensitivities of corresponding patrons, final delivery times associated with these hamburger patties, anticipated arrival times of delivery vehicles assigned to collect corresponding food orders, etc., such as described above.

Similarly, the ordering platform can reallocate an ingredient from one food order to another based on like ingredient quantities specified in the two food orders. In this implementation, the ordering platform can identify a quantity of an ingredient previously dispensed for a first food order currently in process at the food assembly apparatus and approximating an amount of the same ingredient specified in a second food order, and the ordering platform can reallocate this quantity of the ingredient to the second food order. In the foregoing example, for the food assembly apparatus that grinds hamburger patties of various sizes and/or of various blends of meat types, the ordering platform can also select an in-process hamburger patty from a first food order to a second food order based on similar patty sizes and/or meat blends specified in the first and second food orders, such as within a threshold size difference of 10% or within a threshold meat composition difference of 20% per specified meat type between hamburger patty specifications in the first and second food orders. In another example, for the food assembly apparatus than dispenses and melts cheese onto a hamburger bun, in response to receipt of a new food order specifying a preset mass of cheese and necessitating reallocation of in process ingredients in order to meet a delivery time requirement, the ordering platform can identify— within the food assembly apparatus—an in-process bun onto which the preset mass of cheese has already been dispensed and then reallocate this bun to the new food order.

In yet another example, the food assembly apparatus can include topping modules that sequentially dispense tomato, pickles, onion, and then lettuce onto hamburger buns below. In this example, upon identification of a need to promote a new food order specifying tomato, onion, and lettuce but no pickles in order to meet a delivery time objective for the new food order, the ordering platform can reallocate: a first bun currently in a toaster module and assigned to a first food order currently in process; a second bun with tomato currently heading from a tomato module to a pickle module and assigned to a second food order currently in process; or a fourth bun with tomato and onion but no pickle currently heading from the onion module to a lettuce module and assigned to a fourth food order currently in process to the new food order despite topping specifications in the first food order; pickle, onion and lettuce specifications in the second food order; and lettuce specifications in the fourth food order. However, the food assembly apparatus can disregard a third bun with pickle currently heading from the pickle module to the onion module and assigned to a third food order as a candidate for reallocation to the new food order due to presence of an ingredient (i.e., pickle) on the third bun not designated in the new food order.

The ordering platform can therefore acknowledge multiple variables—such as doneness level, size (or weight), composition, latest delivery time, patron wait time sensitivity, etc. —when reallocating an ingredient from one food order to another. However, the ordering platform can accommodate any other factor or parameter when reallocating an ingredient or group of ingredients from one food order to another in Block S172. Furthermore, for a food order dispossessed of an ingredient in Block S172, the ordering platform can implement similar methods and techniques to re-insert the food order into the food order queue in Block S170, such as to construct the food order with unallocated ingredients or to similarly reallocate ingredients from other food orders.

Furthermore, in this variation, the ordering platform can cooperate with the ordering interface in Block S124 to selectively and in real-time reduce custom options available for a new food order based on a projected arrival time of a delivery vehicle to a local food assembly apparatus and/or based on ingredient quantities and qualities specified in other food orders currently in the food assembly apparatus's queue in order to preserve re-queuing and reallocation options for the remote patron's new food order. In particular, the ordering platform can limit customization options currently available to a patron through the ordering interface in order to force alignment of the patron's new food order to other food orders currently assigned to the food assembly apparatus's queue, such as: by removing an option for a particular ingredient if a large proportion of food orders currently in the queue omit this ingredient or if an impending influx of food orders omitting this ingredient are anticipated; by automatically selecting a meat blend and patty size for a hamburger patty substantially similar to (e.g., within a threshold composition difference and within a threshold size difference) meat blends and sizes for hamburger patties specified in food orders in the queue; or by removing a greater doneness level option for a new food order if the projected time to arrival of an assigned delivery vehicle necessitates that a patty already cooked (for another food order) to a lower doneness level be used to assemble the new food order.

Furthermore, the ordering platform can cooperate with the ordering interface to enable a patron to exchange rapidity of delivery for increased customization options for the new food order. For example, the ordering interface can enable the patron to exchange rapid assembly of the food order—according to limited customization options—in time for immediate collection of a nearby delivery vehicle for access to additional customization options for the food order, which may require that the food order to be assembled from previously unallocated ingredients, thereby necessitating additional time to assemble the food order and necessitating assignment to another delivery vehicle for later delivery to the patron.

The ordering platform can implement similar methods and techniques to reallocate or re-queue food orders in response to an assembly. For example, if a volume of dispensed sauce does not land squarely on a bun and contaminates the outside of the bun assigned to a particular food order, the food assembly apparatus can discard the bun and reallocate a bun from another (e.g., a subsequent) food order to the particular food order if insufficient time remains to begin construction of a new unit of the particular food order given a current target delivery time or if other ingredients in the particular food order (e.g., a hamburger patty) are already prepared or in process for the particular food order. Similarly, the ordering platform can implement the foregoing methods and techniques to reallocate ingredients from a first food order to one or more other food orders if the first food order was cancelled after assembly of the first food order began and before the first order is completed. However, the ordering platform can implement the foregoing methods and techniques to re-queue food orders and reallocate ingredients at the food assembly apparatus in response to any other event or input.

14. Handoff and Delivery

One variation of the method S100 includes Block S188, which recites releasing the custom food order to a particular delivery vehicle upon completion of the custom food order at the food assembly apparatus. Generally, in Block S188, the food assembly apparatus can handoff one or more food orders to an assigned delivery vehicle upon arrival of the delivery vehicle. For example, the food assembly apparatus can include a conveyor or other mechanized subsystem that automatically deposits one or more food orders (e.g., batches of food orders) into adjacent delivery vehicles. Alternatively, a human representative of the food assembly apparatus or the delivery vehicle's driver can manually collect an assigned food order from the food assembly apparatus and manually load this batch into the delivery vehicle.

In one implementation, the ordering platform generates (or interfaces with an external delivery service platform or an external mapping service to generate) a best or preferred route between the food assembly apparatus and delivery locations of assigned food orders based on the location of the food assembly apparatus, the destination locations of food orders in the batch, current and historical local traffic data, local routes previously taken by the driver, etc. From these data, the ordering platform can generate a delivery schedule for the batch of food orders and then transmit an updated delivery schedule to the delivery vehicle, such as to the driver's smartphone via a computer network.

15. Notifications

In one variation, the ordering platform can track the patron's food order as the food order is assembled in the food assembly apparatus. For example, the ordering platform can interface with the food assembly apparatus to identify a current stage of each ingredient assigned to the patron's food order, such as meat-grinding, patty-pressing, broiling, bun toasting, topping addition, condiment addition, bagging, and hold-for-pickup stages for a hamburger. At each stage, the ordering platform can notify the patron of the status of his food order, such as by pushing a notification to the patron's mobile computing device. For example, the ordering platform can push notifications that recite "patty press complete; beginning charbroil" and then "tomatoes added; moving to pickle station" to the patron's mobile computing device substantially in real time. In this implementation, the ordering platform can further enable the patron to make last-minute changes to his order before each ingredient specification (e.g., patty doneness, bun toast level) are realized or before ingredients are added to a food assembly at the food assembly apparatus. For example, upon receiving a "tomatoes added; moving to pickle station" notification, the patron can access the food order through an ordering interface executing on his mobile computing device and remove pickles from his food order, and the ordering platform can receive this change and update the patron's food order accordingly before the food assembly apparatus adds pickles to the food assembly at the pickle station, such as described in U.S. patent application Ser. No. 14/208,149, filed on 13 Mar. 2014, which is incorporated in its entirety by this reference.

16. Universal Custom Food Orders

One variation of the method S100 includes Block S130, which recites identifying a trend in an amount of the ingredient in food orders previously submitted within a region proximal the location of the computing device, and Block S132, which recites shifting the quantity of the ingredient specified in the custom food order toward the amount of the ingredient. Generally, in this variation, the ordering platform can modify ingredient quantities and qualities specified in a new custom food order to align to taste preferences extrapolated from food orders (and patron feedback) previously entered by other patrons near the delivery location specified in the new custom food order. In particular, prior to inserting a new custom food order into a food assembly apparatus queue, the ordering platform can genericize a new custom food order in Block S132 based on regional taste preference data processed in Block S130 in order to form a custom food order marketable to a greater number patrons nearby should the patron no longer be available to collect the food order.

In one implementation, the ordering platform: retrieves food orders previously entered by patrons within a threshold distance (e.g., two miles) from a new patron's current location; identifies a subset of these previous food orders that specify ingredient quantities and qualities similar to those specified in the new custom food order (e.g., similar combinations of toppings, similar amounts of seasonings and sauces, and similar hamburger patty doneness levels); and averages quantities and qualities of these ingredients specified in the subset of previous food orders in Block S130. In Block S132, the ordering platform can then shift a quantity of an ingredient in the new custom food order by up to a threshold amount (e.g., a relative amount of ±20% by mass of salt, an absolute amount of ±15 grams of cheese) toward a corresponding average amount of the ingredient calculated from the subset of previous food orders. In Block S132, the ordering platform can similarly shift a quality of an ingredient in the new custom food order by up to a threshold amount (e.g., a relative change of ±5% in patty temperature, an absolute change in patty temperature ±5° F., an absolute shift from rare to medium-rare patty doneness) toward a corresponding average quality of the ingredient calculated from the subset of previous food orders. The ordering platform can then insert this "normalized" or "genericized" custom food order into the food assembly apparatus's queue in Block S150.

Furthermore, in the variation described above in which the ordering platform aligns ingredient quantities and qualities in a food order to processing resolution capabilities of subsystems in the food assembly apparatus, the ordering platform can also: identify a trend in a cook degree for the first ingredient in food orders previously submitted within a region proximal the food assembly apparatus in Block S130; shift the second cook level of the first ingredient specified in the second custom food order toward the cook degree for the first ingredient in Block S132; and then align the second cook level of the first ingredient specified in the second custom food order to a cooking resolution for the first ingredient supported by the food assembly apparatus in Block S142.

In this variation, the ordering platform can selectively execute Blocks S130 and S132 for food orders specifying delivery but not for food orders designating in-store pickup. In particular, the ordering platform can align a custom hamburger order for delivery to local trends in ingredient quantities and qualities for similar food orders in order to improve marketability for the new custom food order to other local patrons if the corresponding patron is later unavailable to collect the custom food order, but the ordering platform may permit greater customization of a food order for a patron who is physically present at the food assembly apparatus to collect his custom food order.

In another implementation, an ordering interface collects qualitative taste preferences for a new food order from a patron, and the ordering platform transforms these qualitative taste preferences into quantitative values for the food order based on local trends in food orders in Block S132. For example, the ordering interface can prompt a patron to elect: a sweet or savory hamburger; a spicy or mild hamburger; a large or small hamburger; a salty hamburger; and/or a heavy or light hamburger; etc. In this example, the ordering platform can apply trends in ingredient amounts and other food order specifications previously entered by other local patrons to the patron's new qualitative food order to calculate particular quantitative amounts of each ingredient (e.g., an amount of salt in milligrams, an amount of tomato in number of discrete slices, an amount of sauce in milliliters) and quantitative preparation values (e.g., hamburger patty temperature when done) for the patron's food order. In particular, prior to inserting the patron's new custom food order into a food assembly apparatus queue, the ordering platform can apply quantitative taste preferences from a group of other local patrons (e.g., extrapolated from previous food orders) to the patron's new qualitative food in order to generate a generic custom food order that both fulfills the patron's food order specifications and substantially aligns with local taste preferences.

The ordering platform can implement similar methods and techniques to calculate "universal" custom food orders for a geographic region. The ordering platform can then populate a default menu with these "universal" custom food orders and/or pre-load a delivery vehicle with units of these "universal" custom food orders, as described below.

17. Redistributing Food Orders

Figure 5:
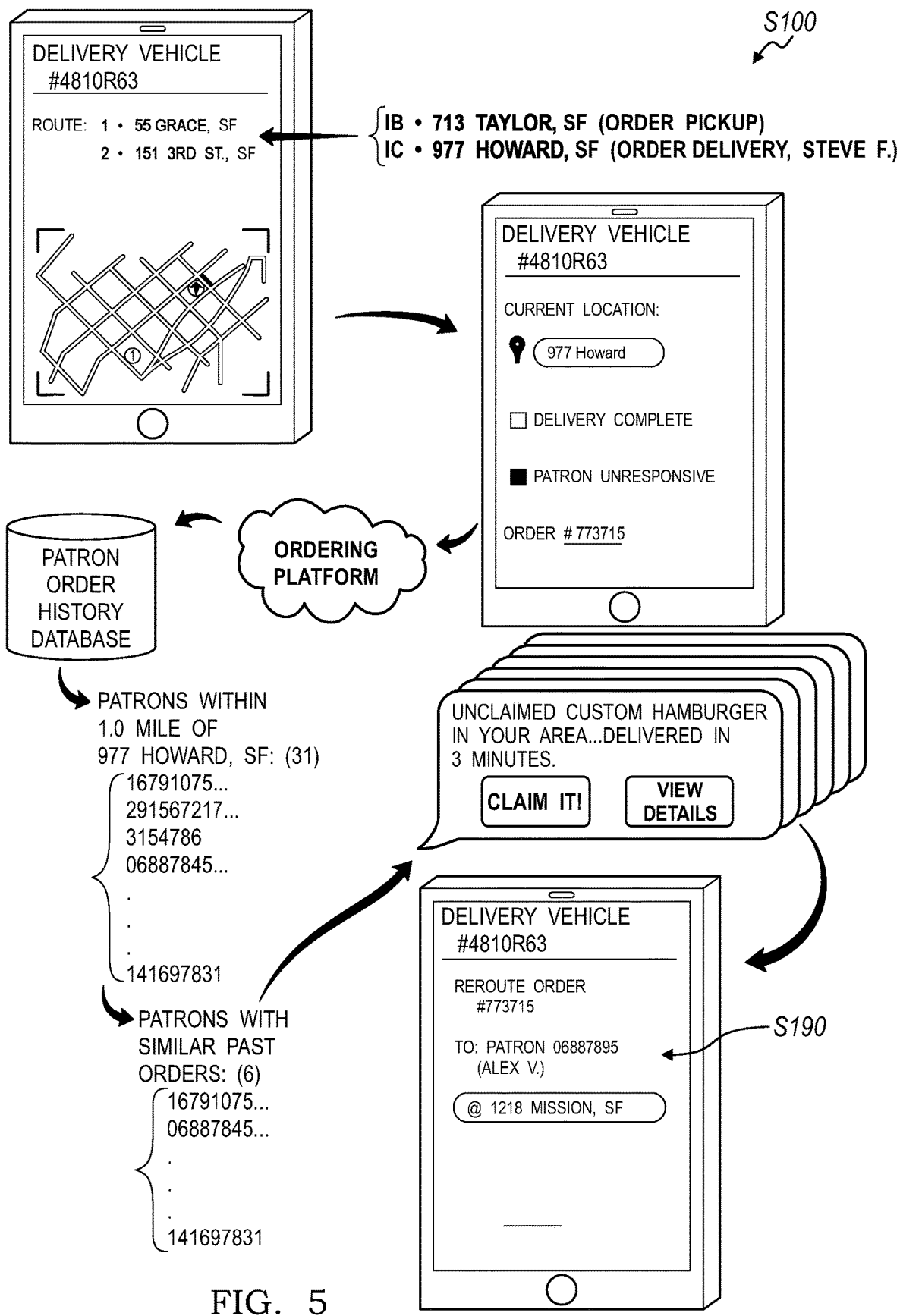
FIG. 5 is a flowchart representation of one variation of the method.

As shown in FIG. 5, one variation of the method S100 includes Block S190, which recites, in response to decline of the custom food order by the patron, releasing the custom food order to a second patron with the region. Generally, in Block S190, the order platform can redistribute a custom food order from a first patron who submitted the custom food order to a second local patron, such as if the first patron is not longer available to collect the custom food order from the delivery vehicle.

In one example, if the first patron fails to collect the custom food order within two minutes of the delivery vehicle's arrival at the delivery location or if the first patron actively indicates that he no longer wishes to receive the custom food order through the ordering interface, the ordering platform can: identify a set of patrons exhibiting taste preferences represented by the custom food order and associated with the region; transmit notifications indicating availability of the custom food order to computing devices associated with the set of patrons; and then reallocate the custom food order to the second patron in response to receipt of purchase confirmation from a computing device associated with the second patron in Block S190. Therefore, in this example, the ordering platform receives a food order from a first patron, queues the food order at the food assembly apparatus, and dispatches a delivery vehicle to deliver the food order to the first patron, as described above. However, if the first patron is not available to receive his food order within a threshold period of time after arrival of the delivery vehicle at the first patron's specified delivery location, the driver of the delivery vehicle can leave the delivery location with the first patron's food order still onboard. The delivery service platform and/or the ordering platform can then post the driver's route and availability of the custom food order to an online network to inform other patrons—through the online network—that the custom food order is available for immediate delivery and to enable these other patrons to purchase, bid on, or otherwise acquire the custom food order.

In the foregoing example, in response to confirmation from the driver that the first patron did not collect his food order, the ordering platform can additionally or alternatively push the delivery vehicle's route and availability of the custom food order to accounts or computing devices of select patrons along (or within threshold driving time or distance from) the delivery vehicle's route who have historically ordered similar food items at similar times of day. The ordering platform can therefore personally inform these other patrons that the custom food order is available for immediate delivery. The ordering platform can also send a projected delivery time of the custom food order with each corresponding notification, such as based on the current location of the corresponding patron, the current location of the delivery vehicle, and current local traffic conditions, etc. A second patron—in the group of patrons thus notified of the availability of the custom food order—can then claim the custom food order through his notification or through an instance of the ordering portal linked to the notification. The ordering platform can then confirm a claim for the custom food order—such as on a first-come, first-served basis or based on prioritization of patrons within the select group (e.g., to limit divergence of the delivery vehicle from its currently-assigned route)—based on inputs received from patrons through their ordering interfaces. When the custom food order is claimed by a second patron, the ordering platform (and/or the delivery service platform) can re-insert the custom food order in the delivery vehicle's route for delivery to the second patron.

In this implementation, the ordering platform can prioritize notifications sent to other patrons for the unclaimed custom food order. For example, in the event of an unclaimed custom food order, the ordering platform can filter other local patrons by customization options and food order histories previously submitted by these local patrons in order to select a limited number of local patrons exhibiting taste preferences and/or food order preferences substantially similar to those manifest in the unclaimed custom food order. In another example, if a second patron recently submitted a food order substantially similar to the unclaimed food order and the projected time to deliver the unclaimed food order to the second patron is significantly less than the projected time to assemble and deliver the second patron's food order, the ordering platform can push a notification to the second patron's smartphone asking the second patron if he would prefer to take the unclaimed food order sooner rather than wait longer to receive his own (slightly different) food order. In this example, if the second patron elects the unclaimed food order, the ordering platform can reroute the delivery vehicle to the second patron's location for delivery of the unclaimed food order. The ordering platform can also return payment for the second patron's original food order and bill the second patron for the first patron's custom food order, such as at a discount, or bill or return monies to the second patron for a cost difference between the two food orders. The ordering platform can also: cancel the second patron's original food order if not yet initiated at a food assembly apparatus; reallocate in-process ingredients from the second patron's original food order to other food orders in the food assembly apparatus's queue (e.g., to remake the first patron's custom food order for reattempted delivery) if production of the second patron's original food order is already begun; or prompt another patron (e.g., the first patron) to accept the second patron's original food order if already complete.

In this example, the ordering platform can sell the custom food order to another patron at a reduced rate, such as at a dynamic discount to encourage purchase at a cost to produce and deliver the food order. The ordering platform can also auction the unclaimed custom food order to other local patrons. For example, when a driver of a delivery vehicle submits to the ordering platform confirmation that a food order was unclaimed by a corresponding patron, the ordering platform can generate an auction listing for the unclaimed custom food order, set a limited auction time for the food order corresponding to a food safety or food quality consumption window (e.g., fifteen minutes), set a minimum bid value for the food order (e.g., $1 or 50% of the original cost of the food order), and push notifications for the auction to select patrons, such as to ten patrons located along the delivery vehicle's current route and with associated taste preferences relevant to ingredient quantities and qualities specified in the unclaimed custom food order. The ordering platform can then handle bids for the custom food order entered by these patrons through instances of the ordering interface executing on their smartphones or other computing devices and confirm reassignment of the custom food order to a particular patron upon conclusion of the auction or upon receipt of a bid exceeding a dynamic reserve price from a patron within a threshold range of a current location of the delivery vehicle. In this example, the ordering platform can also drop select patrons from auction over time as the delivery vehicle moves outside of delivery range of these patrons.

However, the ordering platform can implement any other method or technique to reassign or reallocate a custom food order—not collected by a patron who submitted the custom food order—to another local patron.

In a similar variation, the ordering platform (and/or the external delivery service platform) can redistribute completed food orders based on changes to a food order—already loaded into a delivery vehicle for subsequent delivery—received from a patron. For example, after a food order is completed by the food assembly apparatus and loaded into a delivery vehicle for delivery to a corresponding patron, the patron can modify specification for the food order through an ordering interface executing on her smartphone, such as by adding an additional topping or by modifying a doneness of a hamburger patty. Based on this change, the ordering platform can scan specifications of food orders currently loaded into the delivery vehicle for a second food order—associated with a second patron—that meets the patron's new specifications within one or more thresholds and can reallocate the second food order to the patron. If the patron's original food order meets the specifications of the second food order within one or more thresholds, the ordering platform can similarly reallocate the food order to the second patron, thereby exchanging two food orders between two patrons based on a food order change received from one of the two patrons. In this example, if the food order does not sufficiently meet specifications entered by the second patron, the ordering platform can reinsert the second food order into the food assembly apparatus's food order queue for reproduction. In this variation, the ordering platform can interface with the ordering interface to limit a patron's modification to her food order based on specifications of other food orders loaded into the same delivery vehicle. The ordering platform (and/or the external delivery service platform) can also redistribute food orders—loaded in a cluster of local delivery vehicles—between patrons. However, if a patron retroactively modifies her food order but no other food order loaded into the same delivery vehicle sufficiently matches the patron's new food order specifications, the ordering platform can reallocate the patron's original food order to another patron, insert the patron's new food order into the food assembly apparatus's food order queue for subsequent assembly, and queue another delivery vehicle to collect and deliver the patron's new food order, as described above.

18. Pre-Loaded Delivery Vehicles

In one variation, the ordering platform defines a preset menu of standard food orders and queues units of these standard food orders for assembly at a food assembly apparatus. The food assembly apparatus can therefore pre-make units of these standard food orders, and these standard food orders can be pre-loaded into one or more delivery vehicles. Thus, when a patron accesses the ordering interface to place a food order for delivery, the ordering interface can present a current stock of standard food orders loaded into delivery vehicles within a minimum delivery time or distance of the patron's current location. Upon receipt of a selection of a standard food order in the ordering interface, the ordering platform can route a delivery vehicle loaded with a unit of the standard food order to the patron's location.

Alternatively, the ordering platform can implement methods and techniques described above to filter this list of in-stock standard food orders as the patron selects builds a "custom" food order by selected various ingredient quantity and quality options within the ordering interface. Similarly, as the patron makes such ingredient quantity and quality selections from this list of in-stock standard food orders, the ordering interface can update a projected delivery time for the patron's food order based on which local delivery vehicles are loaded with a food order that meets the patron's customization selections.

In this variation, the ordering platform can generate a default menu of standard food orders limited to a particular geographic region (e.g., a four-square mile rectangular area) based on food orders previously placed by patrons within the particular geographic region. In one implementation, the ordering platform retrieves historical food order data for the particular geographic region and merges these data into a limited set of distinct taste profiles characteristic of patrons within the geographic region. In this implementation, the ordering platform can prioritize more recent food orders over older food orders and can prioritize previous custom orders over default menu selections in order to track distinct and specific changes in taste preferences of patrons within the geographic region over time. The ordering platform can then: extract taste profile trends from these prioritized food order data based on time of year, day of week, time of day, meal (e.g., menu items with eggs and cured meats for breakfast, lighter menu items for lunch, heavier menu items for dinner), and/or any other pattern or schema; apply taste profile trends to customization options available at a local food assembly apparatus (e.g., topping and condiment modules loaded into the local food assembly apparatus) to generate recipes for distinct food order types; aggregate these distinct food order types into a default menu for the geographic region; and push the default menu (or menu updates) to instances of ordering interfaces executing across computing devices of patrons within the geographic region. In this implementation, the ordering platform can recalculate or update the default menu regularly such as weekly, daily, hourly, or accordingly to any other schedule.

In another implementation, the ordering platform retrieves historical food order data for a particular geospatial region and distributes historical food orders into distinct buckets of orders exhibiting similarities, such as specifying similar groupings of condiments and toppings (e.g., tomato, pickle, and/or lettuce), similar amounts of condiments and toppings, similar meat doneness, similar salt and spiciness, similar bun types, etc. For example, the ordering platform can distribute historical food order data across six distinct order buckets; for each bucket, the ordering platform can merge distinct orders within the bucket into one recipe for a standard food order representing a taste preference represented in the bucket. In this example, the ordering platform can generate recipes for standard food orders that exhibit large taste profile distinctions across the six distinct standard food orders while still achieving general relevance of at least one of the six standard food orders to at least a target percentage (e.g., 90%) of patrons within the geographic region, as determined from food orders previously submitted by patrons in this geographic region. In this implementation, the ordering platform can generate a default menu from these standard food orders and push the default menu to ordering interfaces accessed by computing devices within the corresponding geographic region, as described above.

In this variation, the ordering platform can cooperate with a food assembly apparatus and a delivery service platform to coordinate assembly of standard food orders from a default menu at the food assembly apparatus for pickup by a delivery vehicle from the delivery service platform for subsequent delivery to local patrons, such as before an order for a standard food order is received from a local patron. The ordering platform can thus cooperate with the delivery service platform to preload the delivery vehicle with standard food orders from a default menu, as described above. For example, a delivery vehicle assigned to a particular geographic region can be initially loaded with one or more units of each standard food order in a default menu associated with the particular geographic region, such as five units of each of the six standard food orders based on predicted demand for each standard food order extrapolated from historical food order data within the geographic region. The ordering platform can also distribute notifications to patrons—within the geographic region or at locations along or near the delivery vehicle's assigned delivery route—to inform these patrons of current availability of standard food orders for substantially immediate delivery.

19. Rideshare

In one variation, the ordering platform and/or the delivery service platform can enable a patron to elect a rideshare option in addition to ordering a food order through the ordering interface.

In one example, for a food order submitted by a patron with a delivery location other than the current location of the patron, the ordering interface can prompt the patron to select a personal transportation option and to be delivered with his food order to the delivery location. In this example, the ordering interface can dispatch a delivery vehicle to collect the patron and the patron's food order in an order most efficient for the delivery vehicle based on the current location of the patron, the current location of the delivery vehicle, the specified delivery location, a location of a food assembly apparatus assigned to complete the food order, and an estimated time to complete the food order at the selected food assembly apparatus. The ordering interface can further enable multiple other patrons associated with the (first) patron to also submit food orders linked to the (first) patron's original food order, such as to create a group lunch order. The ordering platform can thus dispatch a delivery vehicle to deliver a patron his food order, and food orders of other patrons in his group to a particular destination where the patron can collect both his food order and food orders of other patrons in his group from the delivery vehicle. The patron can thus carry these food orders to meet these other patrons in the group, such as for lunch or dinner or a picnic.

In another example, the ordering interface can enable a patron to submit a current location, a destination location, a food order for a hamburger, a request for personal transportation, and an option to consume the food order during transportation. In this example, the ordering platform and/or the delivery service platform can dispatch a delivery vehicle to a nearest (or most available) food assembly apparatus to collect the patron's food order and then to the patron's current location to collect the patron before delivering both the patron and his food order to the destination location. In this example, the ordering platform (and/or the delivery service platform) can bill the patron a cleaning and trash disposal surcharge—in exchange for permission to eat in the delivery vehicle—in additional to the cost of the food order, the cost of collection of the food order, and the cost to transport the patron.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for fulfilling custom food orders comprising:
in response to receiving a request for a custom food order from a patron through an ordering portal executing on a computing device, retrieving a location of the computing device;
identifying a set of food assembly apparatuses within a threshold distance of the location of the computing device;
aggregating a list of ingredients currently loaded into food assembly apparatuses in the set of food assembly apparatuses;
creating an empty set of ingredients;
offering the list of ingredients for selection by the patron through the ordering portal;
refreshing the list of ingredients in response to receiving, from the patron, a selection of an ingredient from the list of ingredients, wherein the refreshing includes:
adding the selected ingredient to the set of ingredients;
for each food assembly apparatus in the set of food assembly apparatuses:
determining whether the food assembly apparatus is currently loaded with the selected ingredient; and
in response to the food assembly apparatus not currently being loaded with the selected ingredient, removing the food assembly apparatus from the set of food assembly apparatuses; and
replacing the list of ingredients with an aggregation of ingredients currently loaded into food assembly apparatuses in the set of food assembly apparatuses;
in response to the custom food order being complete:
selecting a particular food assembly apparatus, from the set of food assembly apparatuses, that is currently loaded with the set of ingredients; and
inserting the custom food order, including the set of ingredients, into a food order queue assigned to the particular food assembly apparatus; and
in response to the custom food order being declined by the patron, releasing the custom food order to a second patron within a region proximal to the location.

2. The method of claim 1, further comprising:
through the ordering portal, receiving a request for a quantity of a particular ingredient from the set of ingredients in the custom food order;
identifying a prevailing amount of the particular ingredient specified in food orders previously submitted by a group of patrons in a region proximal to the location; and
shifting the quantity of the particular ingredient toward the prevailing amount of the particular ingredient.

3. The method of claim 1, wherein aggregating the list of ingredients currently loaded into food assembly apparatuses in the set of food assembly apparatuses comprises downloading a current list of loaded ingredients and a current food processing configuration from each food assembly apparatus in the set of food assembly apparatuses over a computer network.

4. The method of claim 1, further comprising repeating the offering and the refreshing until the custom food order is complete.

5. The method of claim 1, further comprising:
selecting a particular delivery vehicle from a set of delivery vehicles proximal to the particular food assembly apparatus, wherein the particular delivery vehicle is selected based on its distance from the particular food assembly apparatus relative to a distance from a particular food assembly apparatus of another delivery vehicle from the set of delivery vehicles; and
inserting, into a delivery queue for the particular delivery vehicle, a pickup location of the custom food order from the particular food assembly apparatus and a delivery location of the custom food order.

6. The method of claim 5, further comprising:
at a first time, calculating an initial arrival time of the particular delivery vehicle to the particular food assembly apparatus,
wherein inserting the custom food order into the food order queue comprises inserting the custom food order between a second food order and a third food order, for completion at the initial arrival time of the particular delivery vehicle.

7. The method of claim 6, further comprising:
at a second time succeeding the first time, calculating a revised arrival time of the particular delivery vehicle to the particular food assembly apparatus; and
shifting the custom food order ahead of the second food order and the third food order in the food order queue in response to the revised arrival time of the particular delivery vehicle preceding the initial arrival time.

8. The method of claim 7, wherein shifting the custom food order ahead of the second food order and the third food order in the food order queue comprises selectively reallocating an ingredient currently in process at the particular food assembly apparatus, which was originally designated for the second food order, to the custom food order in order to compensate for the revised arrival time preceding the initial arrival time.

9. The method of claim 8, wherein reallocating the ingredient to the custom food order comprises:
proximal to the second time, retrieving a current doneness of a food product designated for the second food order and currently in process at the particular food assembly apparatus; and
in response to a doneness specified in the custom food order exceeding the current doneness of the food product, reallocating the food product from the second food order to the custom food order.

10. A method for fulfilling custom food orders comprising:

in response to receiving a request for a custom food order from a patron through an ordering portal executing on a computing device, retrieving a location of the computing device;

identifying a set of food assembly apparatuses within a threshold distance of the location of the computing device;

aggregating a list of ingredients currently loaded into food assembly apparatuses in the set of food assembly apparatuses;

creating an empty set of ingredients;

offering the list of ingredients for selection by the patron through the ordering portal;

refreshing the list of ingredients in response to receiving, from the patron, a selection of an ingredient from the list of ingredients, wherein the refreshing includes:
  adding the selected ingredient to the set of ingredients;
  for each food assembly apparatus in the set of food assembly apparatuses:
    determining whether the food assembly apparatus is currently loaded with the selected ingredient; and
    in response to the food assembly apparatus not currently being loaded with the selected ingredient, updating the set of food assembly apparatuses by removing the food assembly apparatus from the set of food assembly apparatuses; and
  replacing the list of ingredients with an aggregation of ingredients currently loaded into food assembly apparatuses in the updated set of food assembly apparatuses;

in response to the custom food order being complete:
  selecting a particular food assembly apparatus, from the updated set of food assembly apparatuses, that is currently loaded with the set of ingredients; and
  inserting the custom food order, including the set of ingredients, into a food order queue assigned to the particular food assembly apparatus; and reallocating a food product currently in process at the particular food assembly apparatus, which was originally designated for the custom food order, to a second food order, wherein reallocating the food product to the second food order comprises:
  identifying a discrepancy between: (i) an order specification of the food product specified in the custom food order and (ii) an actual as-made condition of the food product; and
  reallocating the food product with the actual as-made condition from the custom food order to the second food order.

11. The method of claim 10, wherein:
the order specification of the food product includes a specified cooking doneness of the food product, and
the discrepancy includes an actual as-made cooking doneness of the food product exceeding the specified cooking doneness.

12. The method of claim 10, further comprising:
selecting a particular delivery vehicle from a set of delivery vehicles proximal to the particular food assembly apparatus, wherein the particular delivery vehicle is selected based its distance from the particular food assembly apparatus relative to a distance from a particular food assembly apparatus of another delivery vehicle from the set of delivery vehicles; and
inserting, into a delivery queue for the particular delivery vehicle, a pickup location of the custom food order from the particular food assembly apparatus and a delivery location of the custom food order.

13. The method of claim 12, further comprising:
at a first time, calculating an initial arrival time of the particular delivery vehicle to the particular food assembly apparatus,
wherein inserting the custom food order into the food order queue comprises inserting the custom food order between the second food order and a third food order, for completion at the initial arrival time of the particular delivery vehicle.

14. The method of claim 13, further comprising:
at a second time succeeding the first time, calculating a revised arrival time of the particular delivery vehicle to the particular food assembly apparatus; and
shifting the custom food order ahead of the second food order and the third food order in the food order queue in response to the revised arrival time of the particular delivery vehicle preceding the initial arrival time.

15. The method of claim 10, further comprising:
dispatching a delivery vehicle to deliver the custom food order to the location; and
in response to the custom food order being declined by the patron, releasing the custom food order to a second patron within a region proximal to the location.

16. The method of claim 10, wherein aggregating the list of ingredients currently loaded into food assembly apparatuses in the set of food assembly apparatuses comprises downloading a current list of loaded ingredients and a current food processing configuration from each food assembly apparatus in the set of food assembly apparatuses over a computer network.

17. A method for fulfilling custom food orders comprising:
in response to receiving a request for a custom food order from a patron through an ordering portal executing on a computing device, retrieving a location of the computing device;

identifying a set of food assembly apparatuses within a threshold distance of the location of the computing device;

aggregating a list of ingredients currently loaded into food assembly apparatuses in the set of food assembly apparatuses;

creating an empty set of ingredients;

offering the list of ingredients for selection by the patron through the ordering portal;

refreshing the list of ingredients in response to receiving, from the patron, a selection of an ingredient from the list of ingredients, wherein the refreshing includes:
  adding the selected ingredient to the set of ingredients;
  for each food assembly apparatus in the set of food assembly apparatuses:
    determining whether the food assembly apparatus is currently loaded with the selected ingredient; and
    in response to the food assembly apparatus not currently being loaded with the selected ingredient, removing the food assembly apparatus from the set of food assembly apparatuses; and
  replacing the list of ingredients with an aggregation of ingredients currently loaded into food assembly apparatuses in the set of food assembly apparatuses;

in response to the custom food order being complete:
  selecting a particular food assembly apparatus, from the set of food assembly apparatuses, that is currently loaded with the set of ingredients; and inserting the custom food order, including the set of ingredients, into a food order queue assigned to the particular food assembly apparatus;

identifying a particular delivery vehicle proximal to the particular food assembly apparatus;

inserting, into a delivery queue for the particular delivery vehicle, a pickup location of the custom food order from the particular food assembly apparatus and a delivery location of the custom food order;

at a first time, calculating an initial arrival time of the particular delivery vehicle to the particular food assembly apparatus, wherein inserting the custom food order into the food order queue comprises inserting the custom food order between a second food order and a third food order, for completion at the initial arrival time of the particular delivery vehicle;

at a second time succeeding the first time, calculating a revised arrival time of the particular delivery vehicle to the particular food assembly apparatus; and shifting the custom food order ahead of the second food order and the third food order in the food order queue in response to the revised arrival time of the particular delivery vehicle preceding the initial arrival time.

18. The method of claim 17, wherein shifting the custom food order ahead of the second food order and the third food order in the food order queue comprises selectively reallocating an ingredient currently in process at the particular food assembly apparatus, which was originally designated for the second food order, to the custom food order in order to compensate for the revised arrival time preceding the initial arrival time.

19. The method of claim 18, wherein reallocating the ingredient to the custom food order comprises:

proximal to the second time, retrieving a current doneness of a food product designated for the second food order and currently in process at the particular food assembly apparatus; and in response to a doneness specified in the custom food order exceeding the current doneness of the food product, reallocating the food product from the second food order to the custom food order.

* * * * *